No. 688,024. Patented Dec. 3, 1901.
F. F. LOOMIS.
STEERING GEAR AND BRAKE FOR AUTOMOBILES.
(Application filed May 24, 1900.)
(No Model.)

Witnesses:
G B Minard
Bessie Crook

Inventor:
Frank F. Loomis,
by Humphrey & Humphrey,
Attorneys.

UNITED STATES PATENT OFFICE.

FRANK F. LOOMIS, OF AKRON, OHIO.

STEERING-GEAR AND BRAKE FOR AUTOMOBILES.

SPECIFICATION forming part of Letters Patent No. 688,024, dated December 3, 1901.

Application filed May 24, 1900. Serial No. 17,844. (No model.)

*To all whom it may concern:*

Be it known that I, FRANK F. LOOMIS, a citizen of the United States, residing at Akron, in the county of Summit and State of Ohio, have invented a certain new and useful Improvement in Steering-Gear and Brakes for Automobiles, of which the following is a specification.

My invention has relation to improvements in apparatus for steering automobiles and in the brake mechanism for retarding the speed in descending hills or making a stop, and is especially designed for police patrol-wagons.

The objects of my invention are to place the controlling apparatus directly under the driver's control, so that either or both may be operated without requiring any change of position of the driver and which devices shall be simple in construction, effective in operation, and compactly arranged to occupy a minimum of space; and it also consists in devices for severally locking the steering-gear and the brake when desirable or necessary.

Figure 1:
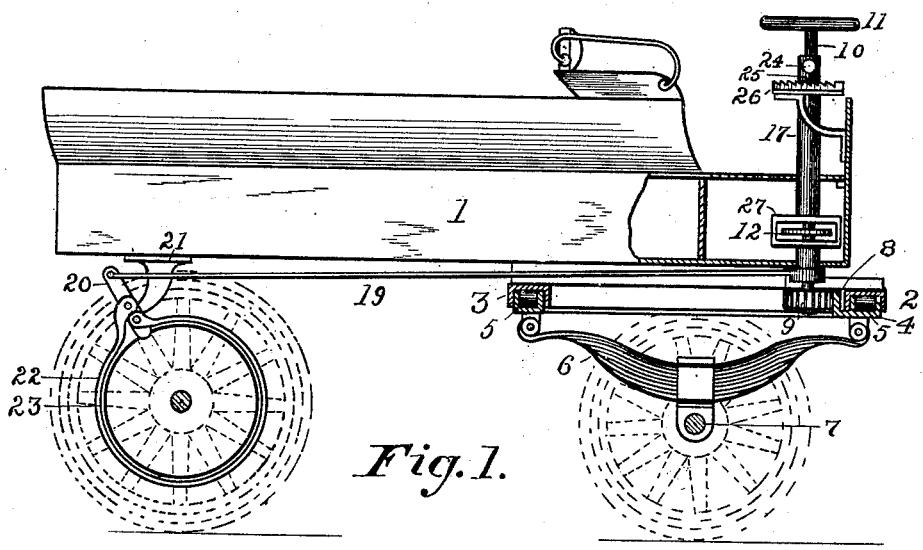
Figure 2:
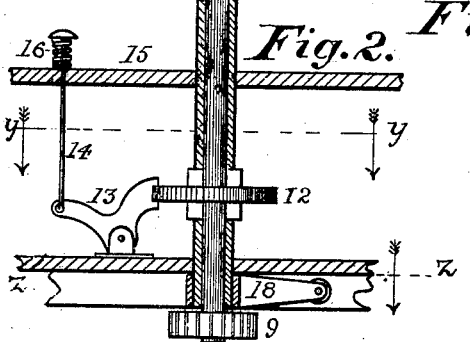
Figures 3, 5:
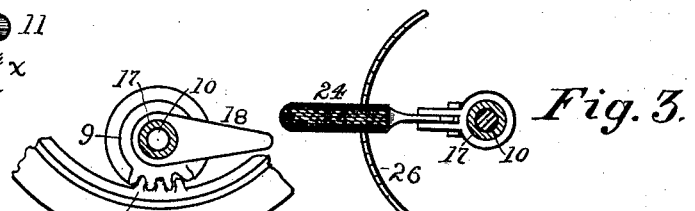
Figure 4:
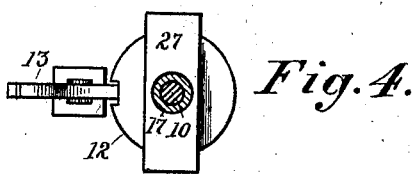

My invention consists in the peculiar and novel construction, arrangement, and combination of parts hereinafter described, and then specifically pointed out in the claims, reference being had to the accompanying drawings, forming a part of this specification.
In the accompanying drawings, in which similar reference-numerals indicate like parts in the different views, Figure 1 is a side elevation of the police patrol-wagon provided with improved steering and brake gear, the wheels being indicated by dotted lines to avoid confusion, and the axles and part of the body being in section to more clearly illustrate the devices; Fig. 2, an enlarged view, looking from the right of Fig. 1, of the brake and steering shafts with their immediately-connected parts, the former shaft being in central section; Figs. 3, 4, and 5, sections of Fig. 2 at the lines $x\ x$, $y\ y$, and $z\ z$, respectively.

Referring to the figures, 1 is the wagon-body, supported at the front by the fifth-wheel 2, consisting of two annular channels 3 4, one fitting within the other and provided with friction-rollers 5, the inner supported by means of springs 6 of the front axle 7.
Attached to the movable ring 4 of the fifth-wheel is an internal gear 8, in which meshes a pinion 9, mounted on a shaft 10, provided with a hand-wheel 11. (Shown enlarged in Fig. 5, but in which figure but a few of the teeth in each part are shown, this being sufficient to show the construction.) By this arrangement the driver can turn the front axle to guide the wagon.

On the shaft 10 is secured a disk 12, having in one side a notch in which fits one end of a bell-crank latch 13, the other end being pivotally connected with a push-rod 14, supported in the wagon-floor 15, terminating in a head convenient to the driver's foot and held up by a spring 16. This part of the apparatus is used in running straight ahead.

Surrounding and forming a support for the shaft 10 is the hollow brake-shaft 17, bearing a radial arm 18, connected by a rod 19 with the lower end of a lever 20, pivotally mounted in hangers 21, one only of which is seen for the reason before stated. This lever is connected on opposite sides of its pivot with the ends of a band-brake 22, that surrounds a brake-rim 23, that is attached to the inner face of the back wheel. Hence it will be apparent that by turning the shaft 17 the rod 19 will be drawn to rock the lever 20 and draw the band 22 about the rim 23, thus setting the brake. The shaft 17 is turned by a hand-lever 24, pivoted to rise and fall and having on its under face a blade 25 to act as a pawl to engage a fixed curved rack 26. This arrangement places the controlling mechanism compactly in front of the driver.

To permit the operation of the locking-disk 12 and the latch 13, a box 27 is interposed in the hollow shaft 17 to partially inclose the former.

I have not shown the driving mechanism, motor, or controller, as these are reserved for a separate application.

Having thus described my invention, what I claim, and desire to secure by Letters Patent, is—

In a steering-gear and brake for automobiles, the combination of a vertical revoluble shaft, means at the top for rotating the same, a pinion mounted at the bottom of said shaft, a segmental rack mounted on the fifth-wheel of said vehicle adapted to be operated by said pinion, a circular disk mounted on said shaft provided with a notch in its periphery, a spring-pressed dog to be operated by a foot-pedal to enter said notch when not under pressure, a sleeve inclosing said vertical shaft having at its lower end a horizontal arm, a brake-rod attached to the end of said arm to operate a brake, a horizontal pivoted handle at the top of said sleeve capable of an up-and-down motion at its outer end, a depending latch on said arm, a circular rack having teeth on its upper surface surrounding said sleeve and adapted to engage said depending latch and retain said sleeve in a desired position, substantially as shown and described.

In testimony that I claim the above I hereunto set my hand in the presence of two subscribing witnesses.

FRANK F. LOOMIS.

In presence of—
C. P. HUMPHREY,
C. E. HUMPHREY.